United States Patent
Dahl et al.

(10) Patent No.: US 9,243,535 B2
(45) Date of Patent: Jan. 26, 2016

(54) METHOD FOR CONTROLLING THE REDUCTANT BUFFER LEVEL IN AN EXHAUST GAS AFTERTREATMENT DEVICE

(75) Inventors: Johan Dahl, Göteborg (SE); Per-Olof Källen, Västra Frölunda (SE)

(73) Assignee: Volvo Lastvagnar AB, Göteborg (SE)

( * ) Notice: Subject to any disclaimer, the term of this patent is extended or adjusted under 35 U.S.C. 154(b) by 89 days.

(21) Appl. No.: 13/516,246

(22) PCT Filed: Dec. 18, 2009

(86) PCT No.: PCT/SE2009/000530
§ 371 (c)(1),
(2), (4) Date: Aug. 22, 2012

(87) PCT Pub. No.: WO2011/075015
PCT Pub. Date: Jun. 23, 2011

(65) Prior Publication Data
US 2013/0186067 A1 Jul. 25, 2013

(51) Int. Cl.
*F01N 3/00* (2006.01)
*F01N 3/20* (2006.01)

(52) U.S. Cl.
CPC *F01N 3/20* (2013.01); *F01N 3/208* (2013.01); *F01N 2560/026* (2013.01); *F01N 2570/18* (2013.01); *F01N 2610/02* (2013.01); *Y02T 10/24* (2013.01)

(58) Field of Classification Search
USPC .................................... 60/272–324
See application file for complete search history.

(56) References Cited

U.S. PATENT DOCUMENTS

| 7,721,535 B2 | 5/2010 | Ruth et al. |
| 2004/0055284 A1 | 3/2004 | Ripper et al. |
| 2004/0098974 A1 | 5/2004 | Van Nieuwstadt et al. |
| 2005/0282285 A1* | 12/2005 | Radhamohan et al. ......... 436/55 |

(Continued)

FOREIGN PATENT DOCUMENTS

| DE | 102007044610 A1 | 4/2009 |
| JP | 2008037770 A2 | 2/2008 |

(Continued)

OTHER PUBLICATIONS

International Search Report (Aug. 26, 2010) for corresponding International application No. PCT/SE2009/000530.

(Continued)

*Primary Examiner* — Jesse Bogue
(74) *Attorney, Agent, or Firm* — WRB-IP LLP

(57) ABSTRACT

A method for controlling a reductant buffer level in an exhaust gas after treatment device connectable downstream of an internal combustion engine includes performing a first reductant injection of a first amount upstream the exhaust gas after treatment device, performing a second reductant injection of a second amount upstream the exhaust gas after treatment device, which second amount is different to the first amount, evaluating the NOx conversion resulting from the first and second reductant injections downstream the exhaust gas after treatment device to obtain a first and second result, controlling a further reductant injection in dependence of the first and second results from the first and second NOx conversion evaluations.

19 Claims, 3 Drawing Sheets

(56) References Cited

U.S. PATENT DOCUMENTS

| | | | |
|---|---|---|---|
| 2008/0102010 A1* | 5/2008 | Bruck et al. | 423/213.2 |
| 2008/0216463 A1* | 9/2008 | Chaineux et al. | 60/274 |
| 2008/0250774 A1* | 10/2008 | Solbrig | 60/295 |
| 2008/0250778 A1 | 10/2008 | Solbrig | |
| 2008/0271440 A1* | 11/2008 | Xu et al. | 60/295 |
| 2010/0223908 A1* | 9/2010 | Solbrig et al. | 60/276 |
| 2011/0162350 A1* | 7/2011 | Ponnathpur | 60/274 |
| 2012/0085082 A1* | 4/2012 | Levijoki et al. | 60/274 |

FOREIGN PATENT DOCUMENTS

| | | | | |
|---|---|---|---|---|
| JP | 2008151039 A2 | 7/2008 | | |
| JP | 2008157136 A * | 7/2008 | | B01D 53/90 |
| WO | 2008043928 A1 | 4/2008 | | |
| WO | WO 2008043928 A1 * | 4/2008 | | |

OTHER PUBLICATIONS

Japanese Official Action (translation) (Dec. 10, 2013) for corresponding Japanese Application 2012-544426.

Chinese Search Report (Jan. 16, 2014) from corresponding Chinese App. 200980163020.8 (citing W)2008/043928 (already of record) and CN101027465A (corresponds to US7721535)).

* cited by examiner

METHOD FOR CONTROLLING THE REDUCTANT BUFFER LEVEL IN AN EXHAUST GAS AFTERTREATMENT DEVICE

BACKGROUND AND SUMMARY

The invention relates to a method for controlling a reductant buffer level in an exhaust gas aftertreatment device according to the preamble of the independent claim.

Present regulatory conditions in the automotive market have led to an increasing demand to improve fuel economy and reduce emissions in present vehicles. These regulatory conditions must be balanced with the demands of a consumer for high performance and quick response for a vehicle.

A diesel engine has an efficiency of up to about 52% and is thus the best converter of fossil energy. NOx emission concentration is dependent upon local oxygen atom concentration and the local temperature. Said high efficiency is however only possible at an elevated combustion temperature at which high NOx levels are inevitable. Moreover, a suppression of NOx formation by internal means (air/fuel ratio) has the tendency to cause an increase in particulates, known as the NOx-particulates trade off. Furthermore, an excess of oxygen in the exhaust gas from a diesel engine prevents the use of stoichiometric 3-way-catalyst technology for reduction of NOx as is used in gasoline engine cars from the late 80-ties.

Reducing the oxides of nitrogen (NOx) and particulate matter (PM) in exhaust gases from a diesel engine has become a very important problem in view of the protection of environment and the saving of finite fossil energy supply.

Vehicles equipped with diesel or other lean burn engines offer the benefit of increased fuel economy, however, catalytic reduction of NOx emissions via conventional means in such systems is difficult due to the high content of oxygen in the exhaust gas. In this regard Selective Catalytic Reduction (SCR) catalysts, in which NOx is continuously removed through active injection of a reductant into the exhaust gas mixture entering the catalyst are known to achieve high NOx conversion efficiency. Urea based SCR catalysts use gaseous ammonia as the active NOx reducing agent. Typically, an aqueous solution of urea is carried on board of a vehicle, and an injection system is used to supply it into the exhaust gas stream entering the SCR catalyst where it decomposes into hydro cyanic acid (NHCO) and gaseous ammonia (NH3), which is then used to convert NOx.

However, in such systems, urea injection levels have to be very precisely controlled. Under-injection of urea may result in sub-optimal NOx conversion, while over-injection may cause tailpipe ammonia slip. In a typical urea-based SCR catalyst system, the amount of urea injected is in proportion to the exhaust gas NOx concentration that represents a trade-off between maximum NOX conversion and minimum ammonia slip.

NOx conversion efficiency of an SCR catalyst is improved in the presence of adsorbed ammonia. However, it is not necessary that all of the catalyst storage capacity is utilized by ammonia in order to achieve optimal NOx conversion efficiency. On the other hand if too much ammonia is stored in the catalyst under certain operating conditions, such as high temperatures, some of the adsorbed ammonia in the catalyst may desorb and slip from the catalyst or to be oxidized to NOx and thereby reducing the overall NOx conversion efficiency.

The problem with a reductant storage catalyst is the control of the amount of reductant stored in said catalyst since a direct measurement is not possible.

It is desirable to provide an improved method for controlling a reductant buffer level in an exhaust gas aftertreatment device which keeps the system out NOx levels at a low level.

In a first aspect of the invention it is provided a method for controlling a reductant buffer level in an exhaust gas aftertreatment device connectable downstream of an internal combustion engine. Said method comprising the steps of: performing a first reductant injection of a first amount upstream said exhaust gas aftertreatment device, performing a second reductant injection of a second amount upstream said exhaust gas aftertreatment device, which second amount is different to said first amount. Said method further comprising the steps of: evaluating the NOx conversion resulting from said first and second reductant injections downstream said exhaust gas aftertreatment device to obtain a first and second result, controlling a further reductant injection in dependence of the first and second results from said first and second NOx conversion evaluations.

An advantage of the present example embodiment of the invention is that the evaluation step and the control step, forming an open loop experiment, can be added to any present control method for the buffer level in the exhaust gas after treatment system.

Another advantage of the present example embodiment of the invention is that the NOx conversion may be kept at a minimum while the open loop experiment is taking place.

In another example embodiment of the present invention a further injection amount after said evaluating step may be increased or decreased compared to said first injection if said second result from said second NOx conversion evaluation is higher or lower than said first result from said first NOx conversion evaluation given that the second injection amount was higher than the first injection amount.

In still another example embodiment of the present invention said further injection after said evaluating step may be decreased or increased compared to said first injection if said second result from said second NOx conversion evaluation is higher or lower than said first results from said first NOx conversion evaluation given that the second injection amount was lower than the first injection amount.

An advantage of these embodiment s are that small alterations of the injected reductant immediately result in a change of NOx reductant level which in turn gives an indication of a empty or full exhaust gas after treatment reductant buffer.

In still another example embodiment of the present invention said method further comprising the step of continuing said increased or decreased further injection until a predetermined level of NOx conversion is reached.

An advantage of this embodiment is that an existing buffer management method may be improved by additional method steps which are independent of said existing buffer management method.

Another advantage of this embodiment is that the buffer level can be kept at an optimal level irrespective of the starting conditions.

Still another advantage of the present invention is that the open loop experiment may be initiated as often as one may require.

BRIEF DESCRIPTION OF THE DRAWINGS

The present invention together with the above-mentioned and other objects and advantages may best be understood from the following detailed description of the embodiment(s), but not restricted to the embodiments, wherein is shown schematically.

DETAILED DESCRIPTION

Figure 1:
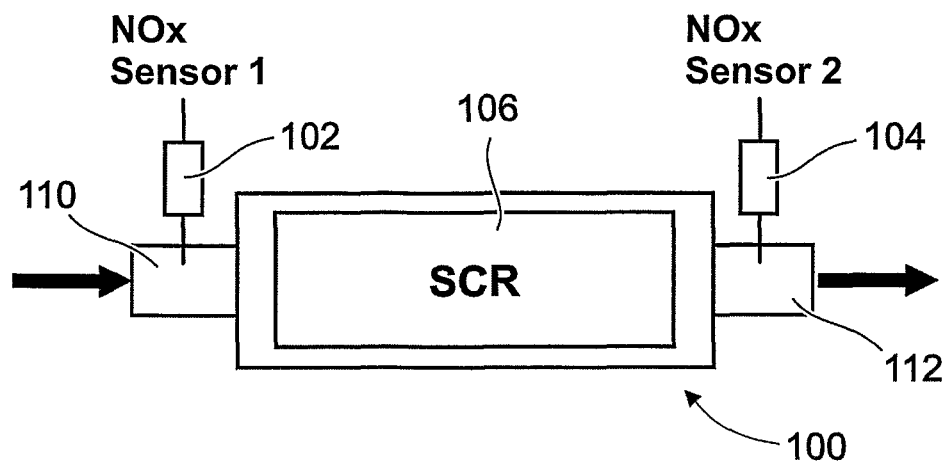
FIGS. 1 and 2 illustrates a prior art exhaust gas aftertreatment system.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 depicts schematically a prior art exhaust gas aftertreatment system 100. Said exhaust gas aftertreatment system 100 comprises a first NOx sensor 102, a second NOx sensor 04, an SCR catalyst 106. The first NOx sensor 102 is provided upstream said SCR catalyst 106. The second NOx sensor 104 is provided downstream said SCR catalyst 106. Said SCR catalyst 106 is provided with an inlet 110 and an outlet 112. The reductant agent may be provided in the inlet 110 to said SCR catalyst 106 or directly into said SCR catalyst 106 before the outlet 112. The reductant agent may be in the form of ammonia or urea.

The functionality of the SCR catalyst is well known in the art and need no further clarification in this context.

Figure 2:
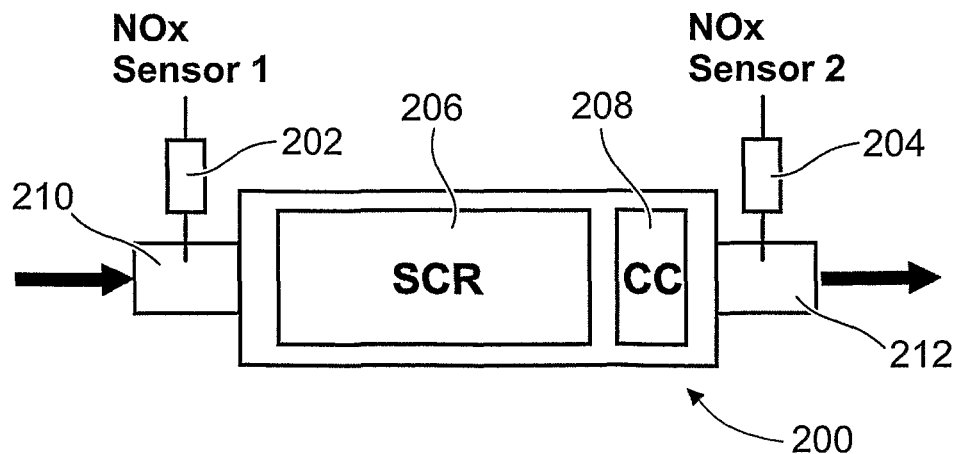

FIG. 2 depicts schematically another example of a prior art exhaust gas aftertreatment system 200. Said exhaust gas aftertreatment system 200 comprises a first NOx sensor 202, a second NOx sensor 204, a SCR catalyst 206 and a clean up catalyst 208. The first NOx sensor 202 is provided upstream said SCR catalyst 206. The second NOx sensor 204 is provided downstream said clean up catalyst 208. Said SCR catalyst 206 is provided upstream of said clean up catalyst 208. The exhaust gas aftertreatment system 200 is provided with an inlet 210 and an outlet 212. The reductant agent may be provided in the inlet 210 to said SCR catalyst 206 or directly into said SCR catalyst 206 before the clean up catalyst 208. The reductant agent may be in the form of ammonia or urea. The clean up catalyst 208 may be used to neutralize any excess ammonia (ammonia slip). The clean-up catalyst 208 may oxidize unused reductants and unadsorbed NH3 using stored oxygen or residual oxygen remaining in the exhaust according to the formula:

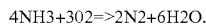

4NH3+3O2=>2N2+6H2O.

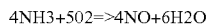

4NH3+5O2=>4NO+6H2O

Figure 3:
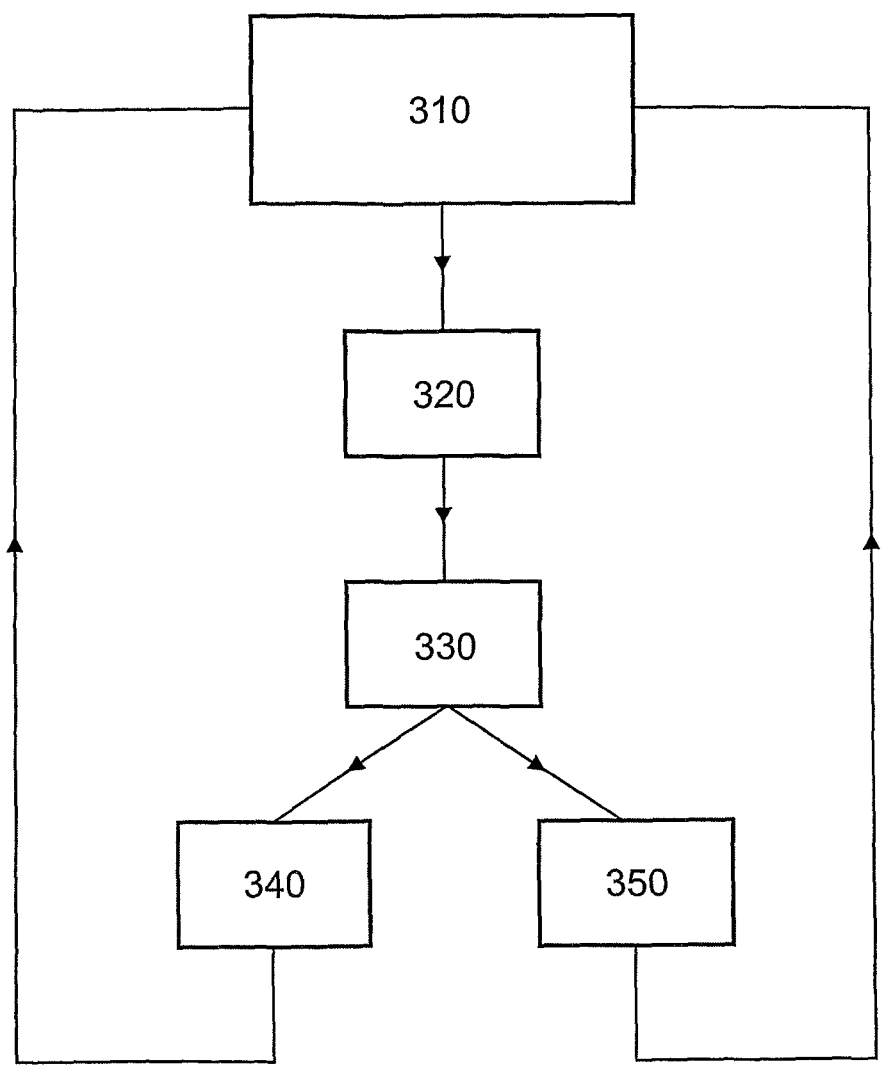
FIG. 3 shows a flowchart of the inventive control method for the exhaust gas aftertreatment system.

FIG. 3 illustrates a flowchart of the inventive control method for the exhaust gas aftertreatment system according to the present invention. In normal operation 310 a nominal amount of reductant agent may be injected into the exhaust gas mixture of the internal combustion engine upstream of the exhaust gas after treatment system 100, 200. The nominal amount of injected reductant agent may be taken from a first look-up table. Actual data (nominal amount of injected reductant agent) taken from the first look up table may be a function of a number of operating parameters such as catalyst temperature, engine speed, engine load, EGR level, NOx concentration upstream and downstream of said exhaust gas aftertreatment system. The actual data (nominal amount of injected reductant agent) taken from the first look-up table may be made by a control unit.

Said control unit comprises an injection reductant agent model compiled from empirical data for the particular exhaust gas after treatment system 100, 200.

In a second look up table there is stored values for expected NOx conversion levels for each situation which may be determined by the nominal amount of injected reductant agent and at least one of the following parameters: catalyst temperature, engine speed, engine load, EGR level.

In case there is a deviation between the expected NOx conversion level and an actual measured NOx conversion level the method goes from the normal operation denoted by 310 to a reductant injection open loop experiment denoted by 320.

In a first example embodiment of the open loop experiment 320 an assumption is made that a reductant buffer is empty or almost empty in said exhaust gas aftertreatment system 100, 200.

Having made the assumption that the reductant buffer in the exhaust gas after treatment system 100, 200 is empty or almost empty, a first step in the open loop experiment is to make two reduction, agent injections. A first injection may be of nominal amount of injected reductant agent. A second injection may be an increase of the reductant agent injection by Δ compared to the amount of the first reductant agent injection.

In a next step of the open loop experiment an experiment result evaluation denoted by 330 is performed.

If the measured NOx conversion level is increased by increasing the reductant injection amount by Δ in the second injection of reductant agent compared to the first injection of reductant injection implies that the assumption in the beginning of the experiment was correct, i.e. that the reductant buffer was in fact empty or almost empty. This case corresponds to a positive flank of curve 400 in FIG. 4, i.e., to the left of a peak 402 in FIG. 4.

If the assumption is correct the open loop experiment continues to the filling step denoted by 340. In the filling step at least one further reductant injection is controlled.

In a first example embodiment said controlling of said at least one further injection of reductant is performed by continuing over-injection by said Δ in said open-loop experiment until a predetermined level of NOx conversion is reached. This may take one or a plurality of injections until it is fulfilled.

In another example embodiment said controlling of at least one further injection of reductant is performed by using an over injection which is higher than said Δ in said open-loop experiment until a predetermined level of NOx conversion is reached. This may take one or a plurality of injections until it is fulfilled.

In still another example embodiment said controlling of at least one further injection of reductant is performed by using an over injection which is started by an over injection of Δ and then increased linearly, exponentially, for every successive injection until a predetermined level of NOx conversion is reached. This may take one or a plurality of injections until it is fulfilled.

In still another example embodiment said controlling of at least one further injection of reductant is performed by using an over injection of a value equal to Δ or greater or smaller than said Δ which is continued a predetermined period of time. During said predetermined period of time one or a plurality of injections may be performed.

In still another example embodiment said controlling of at least one further injection of reductant is performed by using an over injection of a value equal to Δ or greater or smaller than said Δ which is continued for a predetermined number of injections. Said number of injections may be one injection or a plurality of injections.

The Δ values may be taken from the first look up table.

Said Δ may be an increase of 1-25% of the nominal reductant injection amount.

When the predetermined level of NOx conversion is reached or the predetermined time has lapsed or said predetermined number of injections has been made, the open loop experiment is finished and goes back to normal operation 310 denoted by the arrow between the filling box 340 and the normal operation 310.

If, in the experiment result evaluation step 330, the NOx conversion level is decreased by increasing the second reductant agent injection amount by Δ from the first reductant agent injection amount, it implies that the assumption in the beginning of the experiment was incorrect, i.e. the reductant buffer was in fact full. This case corresponds to a negative flank of curve 400 in FIG. 4, i.e., to the right of the peak 402 in FIG. 4.

In the case that the first assumption was found to be incorrect a new assumption may be made that the reductant buffer is full and the open loop experiment continues to the emptying step denoted by 350.

In the emptying step 350 at least one further reductant agent injection is controlled.

In a first example embodiment said controlling of said at least one further injection of reductant agent is performed by an under-injection by Δ in said open-loop experiment until a predetermined level of NOx conversion is reached. This may take one or a plurality of injections until it is fulfilled.

In another example embodiment said controlling of at least one further injection of reductant is performed by using an under injection which is bigger than said Δ in said open-loop experiment until a predetermined level of NOx conversion is reached. This may take one or a plurality of injections until it is fulfilled.

In still another example embodiment said controlling of at least one further injection of reductant agent is performed by using an under injection which is started by an under injection of Δ and then decreased linearly or exponentially for every successive injection until a predetermined level of NOx conversion is reached. This may take one or a plurality of injections until it is fulfilled.

In still another example embodiment said controlling of at least one further injection of reductant is performed by using an under injection of a value equal to Δ or greater or smaller than said Δ which is continued a predetermined period of time. During said predetermined period of time one or a plurality of injections may be performed.

In still another example embodiment said controlling of at least one further injection of reductant is performed by using an under injection of a value equal to Δ or greater or smaller than said Δ which is continued for a predetermined number of injections. Said number of injections may be one injection or a plurality of injections.

When the predetermined level of NOx conversion is reached the open loop experiment is finished and goes back to normal operation 310 denoted by the arrow between the emptying box 350 and the normal operation box 310.

in the example embodiment above the initial assumption when the open loop experiment is started is that the detected deviation between the measured NOx conversion and the expected NOx conversion according to the second look up table is caused by an empty reductant buffer. However, in a second example embodiment of the open loop experiment an assumption may be made that a reductant buffer is full instead of empty. If assuming that the buffer is full instead of empty, all of the above is still valid except that when the reductant agent injection amount is increased in the open loop experiment and the NOx conversion is increased said assumption is wrong, i.e., the buffer is empty and when the NOx conversion is decreased when increasing said reductant injection said assumption of an overfull buffer was correct and the injection amount should instead be reduced by an appropriate predetermined value.

If on the other hand one is starting with the assumption that the buffer is full and a decreased injection amount of reductant agent with Δ will result in an increased NOx conversion implies that the assumption of a full buffer was correct. However, if starting with the assumption that the buffer is full and decreasing the injection amount with Δ resulting in a decreased NOx conversion implies that the assumption was. incorrect, i.e. the buffer was empty.

An assumption that the buffer is empty may normally result in choosing an over injection in order to fill up the buffer. An assumption that the buffer is full may normally result in choosing an under injection in order to empty the buffer.

However, the assumption may be incorrect from the beginning, the assumed full buffer may in fact appear to be empty and the assumed empty butler may in fact appear to be full. All this will be evident from the evaluation of the NOx conversion results of the reduction agent injections in the open loop experiment.

In another example embodiment the reductant injections (which may be denoted a first (nominal) and a second (increased/decreased with Δ) performed in the open loop experiment before the evaluation step may be specific injections coupled to said experiment, i.e. additional injection sequence compared to a normal injection sequence which is given by the first look up table, i.e., different injection timing and different amount.

In the example embodiment described in detail above said injections, (which may be denoted a first (nominal) and a second (increased/decreased with Δ)) is embedded in the normal injection sequence. The first injection amount may be the reductant injection amount present when the open loop experiment is started. The first (nominal) reductant agent injection amount is determined from the model in the control unit and the circumstances given at that particular moment (catalyst temperature, engine speed, engine load, EGR level, NOx concentration upstream and downstream of said exhaust gas aftertreatment system).

The second reductant agent injection amount may be said first injection amount plus a predetermined Δ amount. In another example embodiment said second reductant agent injection amount is the value given by the model at said particular moment when said second injection is about to be performed. This means that the second reductant agent injection amount is determined from the model in the control unit and the circumstances given at that particular time (catalyst temperature, engine speed, engine load, EGR level, NOx concentration upstream and downstream of said exhaust gas aftertreatment system). The first and second injections are separated in time given by said injection model stored in said control unit. In said open loop experiment said second reductant agent injection may be increased/decreased by an amount Δ.

The open loop experiment is continuing with increased or decreased injection amount (depending on the actual situation of the buffer level) until the NOx conversion level is equal to a predetermined value or when a predetermined number of injections have been performed of when a predetermined period of time has lapsed.

The injection model is made out of measurement of a new catalyst. When adding the open loop experiment to this injection model, which may be performed when there is a detected deviation of expected NOx conversion and actual measured NOx conversion, aging of the catalyst is effectively taken care of. Storage capacity and NOx conversion may change as the catalyst becomes older and therefore the injection model which may be fully functional for a new catalyst may not be as good for an old catalyst. Instead of having different injection models depending on the age of the catalyst, one may use one single injection model and the open loop experiment. This combination of a single injection model with the open loop experiment will achieve good NOx conversion through out the life time of the catalyst at the same time as there is a low urea slip.

The result from evaluating the NOx conversion, from said first and second reductant injections, downstream said exhaust gas aftertreatment device to obtain a first and second result may be an indication or an estimation of the age of the catalyst. The more the measured NOx conversion result deviates from the estimated NOx conversion stored in said second look up table the older said catalyst may be.

The result from evaluating the NOx conversion, from said first and second reductant injections, downstream said exhaust gas aftertreatment device to obtain a first and second result may be used to adjust the nominal injections given by the injection amount in said first look up table. This means that the result from the open loop experiment may be used for adaptive adjustment of the nominal injections of reductant injections in the closed loop experiment.

The open loop experiment for determining the buffer level of the catalyst or the age of the same may be used in combination with any standard closed loop control of the nominal injection of reductant agent.

Figure 4:
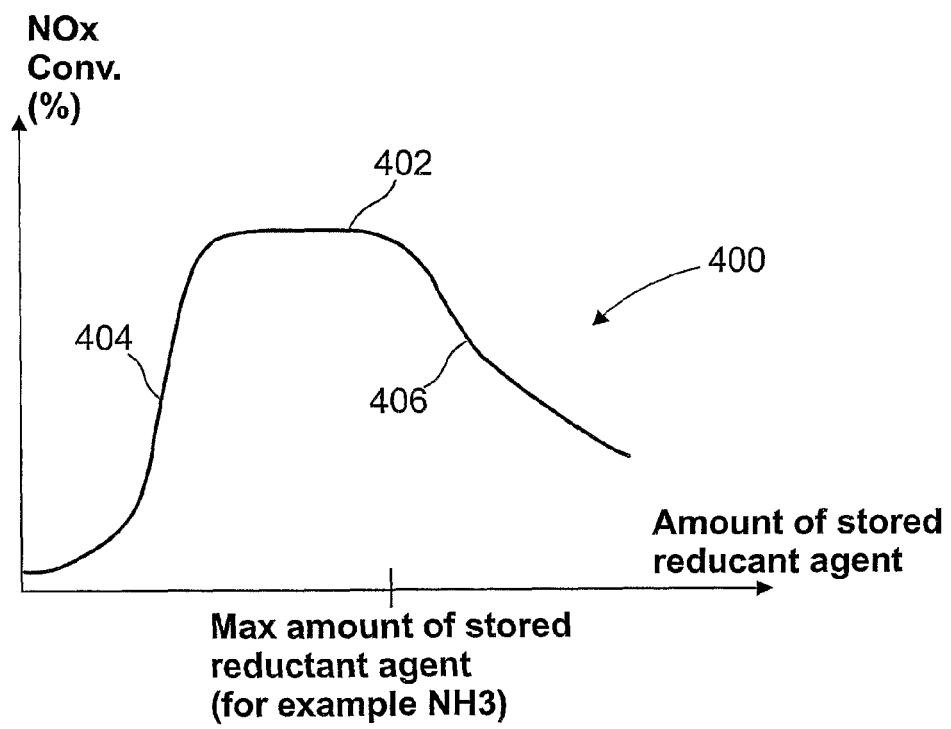
FIG. 4 depicts the NOx conversion degree as a function of stored amount of reductant agent.

FIG. 4 illustrates the NOx conversion degree as a function of stored/buffered amount of reductant agent. The NOx conversion is given in percentage implying that 100% equals full NOx conversion and 0% equal to no NOx conversion at all. Good NOx conversion is normally obtained when the stored amount of NH3 is about 20%-80% of maximum storage capacity. Good NOx conversion can be said to mean when the NOx conversion is higher than 50%.

The amount of reductant is given in for instance in grams or cl. Even a low amount of stored reductant agent is sufficient to improve the NOx conversion. A reason why the NOx conversion decreases above max amount of stored reductant agent is that some of the superfluous reductant may be converted to NOx in the exhaust gas aftertreatment system.

A computer program may comprise program code means for performing at least the open loop experiment when said program is run on a computer.

A computer program product may comprise program code means stored on a computer readable medium for performing at least he open loop experiment when said program product is run on a computer.

The invention should not be deemed to be limited to the embodiments described above, but rather a number of further variants and modifications are conceivable within the scope of the following patent claims.

The invention claimed is:

1. A method for controlling a fill level of a reductant buffer level in an exhaust gas aftertreatment device connectable downstream of an internal combustion engine, the method comprising the steps of making an assumption of the fill level of the reductant buffer, performing a first reductant injection of a first nominal amount upstream of the exhaust gas aftertreatment device, performing a second reductant injection of a second amount upstream of the exhaust gas aftertreatment device, which second amount is different from the first amount and is one of an increase and a decrease of 1-25% of the nominal amount, performing an evaluation step including first and second NOx conversion evaluations of NOx conversion by the exhaust gas aftertreatment device resulting from first and second reductant injections, respectively, to obtain a first and second result, respectively, wherein the evaluation step comprises measuring NOx content of the exhaust gases with a first NOx sensor provided upstream of the exhaust gas aftertreatment device, measuring NOx content of the exhaust gases with a second NOx sensor provided downstream of the exhaust gas aftertreatment device, comparing the measurement from the first and second NOx sensors;

determining whether the assumption of the fill level of the reductant buffer is correct in dependence on the first and second results from the first and second NOx conversion evaluations, and controlling at least one further reductant injection based on whether the assumption of the fill level of the reductant buffer was correct.

2. The method according to claim 1, wherein the first injection amount is smaller than the second injection amount.

3. The method according, to claim 2, wherein a further injection amount injected when controlling the further reductant injection after the evaluating step is increased compared to the first injection amount if the second result from the second NOx conversion evaluation is higher than the first result from the first NOx conversion evaluation.

4. The method according to claim 2, wherein a further injection amount is decreased compared to the first injection amount if the second result from the second NOx conversion evaluation is higher than the first result from the first NOx conversion evaluation.

5. The method according to claim 1, farther comprising the step of injecting reductant agent directly into the exhaust gas aftertreatment device.

6. The method according to claim 1, wherein reductant agent is area.

7. The method according to claim 3, further comprising the step of:

continuing the increased further injection amount of reductant agent until at least one of the following parameters is fulfilled: a predetermined level of NOx conversion is reached, a predetermined number of injections is performed, or a predetermined period of time has lapsed.

8. The method according to claim 1, further comprising the steps of:

comparing a detected NOx conversion level and an estimated NOx conversion level, initiating the step of performing the first reductant injection of the first amount upstream of the exhaust gas aftertreatment device if there is a deviation between detected NOx conversion and estimated NOx conversion.

9. The method according to claim 1, wherein the first injection amount is greater than the second injection amount.

10. The method according to claim 9, wherein a further injection amount is decreased compared to the first injection amount if the second result from the second NOx conversion evaluation is higher than the first result from the first NOx conversion evaluation.

11. The method according to claim 9, wherein a further injection amount is increased compared to the first injection amount if the second result from the second NOx conversion evaluation is essentially identical to or lower than the first result from the first NOx conversion evaluation.

12. The method according to claim 10, further comprising the step of:
continuing the decreased further injection amount until at least one of the following parameters is fulfilled: a predetermined level of NOx conversion is reached, a predetermined number of injections is performed, or a predetermined period of time has lapsed.

13. The method according to claim 1, further comprising the step of:
estimating an age of the exhaust gas after treatment device based on the first and second results from the first and second NOx conversion evaluations.

14. The method according to claim 1, further comprising the step of:
adjusting the first injection of reductant agent in a closed loop based on the first and second results from the first and second NOx conversion evaluations.

15. The method according to claim 1, further comprising the step of:
combining steps a-d with a closed loop control of nominal injections of reductant agent.

16. A computer comprising, program code for performing all the steps of claim 1.

17. A computer program product comprising, program code stored on a non-transitory computer readable medium for performing all steps of claim 1.

18. The method according to claim 4, further comprising the step of:
continuing decreased further injection of reductant agent until at least one of the following parameters is fulfilled: a predetermined level of NOx conversion is reached, a predetermined number of injections is performed, or a predetermined period of time has lapsed.

19. The method according to claim 11, further comprising the step of:
continuing the increased further injection amount until at least one of the following parameters is fulfilled: a predetermined level of NOx conversion is reached, a predetermined number of injections is performed, or a predetermined period of time has lapsed.

* * * * *